US011868796B2

United States Patent
Tsirkin et al.

(10) Patent No.: US 11,868,796 B2
(45) Date of Patent: Jan. 9, 2024

(54) PAGE REQUEST INTERFACE OVERHEAD REDUCTION FOR VIRTUAL MACHINE MIGRATION AND WRITE PROTECTION IN MEMORY

(71) Applicant: Red Hat, Inc., Raleigh, NC (US)

(72) Inventors: Michael Tsirkin, Yokneam Illit (IL); Amnon Ilan, Ra'anana (IL)

(73) Assignee: Red Hat, Inc., Raleigh, NC (US)

( * ) Notice: Subject to any disclaimer, the term of this patent is extended or adjusted under 35 U.S.C. 154(b) by 67 days.

(21) Appl. No.: 17/728,293

(22) Filed: Apr. 25, 2022

(65) Prior Publication Data

US 2022/0244983 A1 Aug. 4, 2022

Related U.S. Application Data

(63) Continuation-in-part of application No. 16/928,284, filed on Jul. 14, 2020, now Pat. No. 11,182,092.

(51) Int. Cl.
*G06F 12/00* (2006.01)
*G06F 9/455* (2018.01)
*G06F 12/14* (2006.01)

(52) U.S. Cl.
CPC .......... *G06F 9/45558* (2013.01); *G06F 12/14* (2013.01); *G06F 2009/4557* (2013.01); *G06F 2009/45583* (2013.01); *G06F 2212/151* (2013.01)

(58) Field of Classification Search
CPC ......... G06F 3/45558; G06F 2009/4557; G06F 2009/45583; G06F 3/0647; G06F 3/0619; G06F 3/0664; G06F 3/0673; G06F 3/0653; G06F 3/0622; G06F 12/14; G06F 2212/151

See application file for complete search history.

(56) References Cited

U.S. PATENT DOCUMENTS

| | | | | |
|---|---|---|---|---|
| 9,870,248 B2 * | 1/2018 | Tsirkin | ............... | G06F 12/1009 |
| 11,243,801 B2 * | 2/2022 | Tsirkin | ............... | G06F 9/45545 |
| 2009/0037682 A1 * | 2/2009 | Armstrong | .......... | G06F 12/1475 718/1 |
| 2013/0262736 A1 * | 10/2013 | Kegel | ................. | G06F 12/1081 711/3 |
| 2020/0341797 A1 * | 10/2020 | Tsirkin | ................. | G06F 3/0664 |

* cited by examiner

*Primary Examiner* — John A Lane
(74) *Attorney, Agent, or Firm* — K&L Gates LLP

(57) ABSTRACT

Page request interface overhead reduction for virtual machine migration and write protection in memory may be provided by generating a page table associated with the memory; in response to receiving a write-protection command to prevent write-access to data from a portion of the memory, write-protecting a first range of memory addresses comprising the data write protected from the portion of the memory, wherein a second range of memory addresses comprises data not write protected in the memory; and modifying the page table to include a page table entry associated with the first range of memory addresses being write-protected, wherein write access to a memory address in the first range of memory addresses by a device during write-protection is tracked.

20 Claims, 9 Drawing Sheets

PAGE REQUEST INTERFACE OVERHEAD REDUCTION FOR VIRTUAL MACHINE MIGRATION AND WRITE PROTECTION IN MEMORY

CROSS-REFERENCES TO RELATED APPLICATIONS

The present disclosure is a continuation in part of U.S. Pat. No. 11,182,092 titled PRI OVERHEAD REDUCTION FOR VIRTUAL MACHINE MIGRATION, which was filed on Jul. 14, 2020 and is incorporated herein by reference in its entirety.

BACKGROUND

The present disclosure generally relates to virtual migration in computer systems. Virtual Machines (VMs) typically migrate data in memory locations between hypervisors of the respective VMs. In some instances, live migration may be used to allow moving VMs between hypervisors with minimal downtime. Generally, live migration refers to the process of moving a running VM or application between different physical machines without disconnecting the client or application. Memory, storage, and network connectivity of the VM are transferred from the original guest machine (e.g., source host) to the destination (e.g., destination host). A key feature of live migration is memory change tracking: each memory page changed by the VM on a source host is copied to a destination host (e.g., memory location). This allows the VM on the source host to keep running while the memory is being set up and migrated to destination host. During memory migration, the hypervisor typically copies all the memory pages from source to destination while the VM is still running on the source. If some memory pages change during this process, they will be re-copied.

SUMMARY

The present disclosure provides a new and innovative system, methods and apparatus for Page Request Interface (PRI) overhead reduction for VM migration and memory write protection. In an example, a system includes a memory and a hypervisor. The memory includes a plurality of memory addresses on a source host. The hypervisor is configured to execute on one or more processors. The hypervisor is configured to generate a page table associated with the memory; in response to receiving a write-protection command to prevent write-access to data from a portion of the memory, write-protect a first range of memory addresses comprising the data write protected from the portion of the memory, wherein a second range of memory addresses comprises data not write protected in the memory; and modify the page table to include a page table entry associated with the first range of memory addresses being write-protected, wherein write access to a memory address in the first range of memory addresses by a device during write-protection is tracked.

In an example, a method includes generating, by a hypervisor, a protection page table associated with a memory comprising a plurality of memory addresses on a host system; receiving, by the hypervisor, a command to write-protect data in a portion of the memory, a first range of memory addresses comprising the data write-protected in the portion of the memory, and a second range of memory addresses comprising data not write-protected; and modifying, by the hypervisor, the protection page table to include a page table entry associated with the first range of memory addresses being write-protected, wherein write access to a memory address in the first range of memory addresses by a device while write-protection is enabled is tracked.

In an example, a non-transitory machine-readable medium storing code, which when executed by a processor is configured to: generate a page table associated with a memory, the memory comprising a plurality of memory addresses on a host system; receive a write-protection command to write-protect data a portion of the memory, including a first range of memory addresses comprising the data to be write-protected; and modify the page table to include a page table entry associated with the first range of memory addresses being write-protected, wherein write access to a memory address in the first range of memory addresses by a device is tracked.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
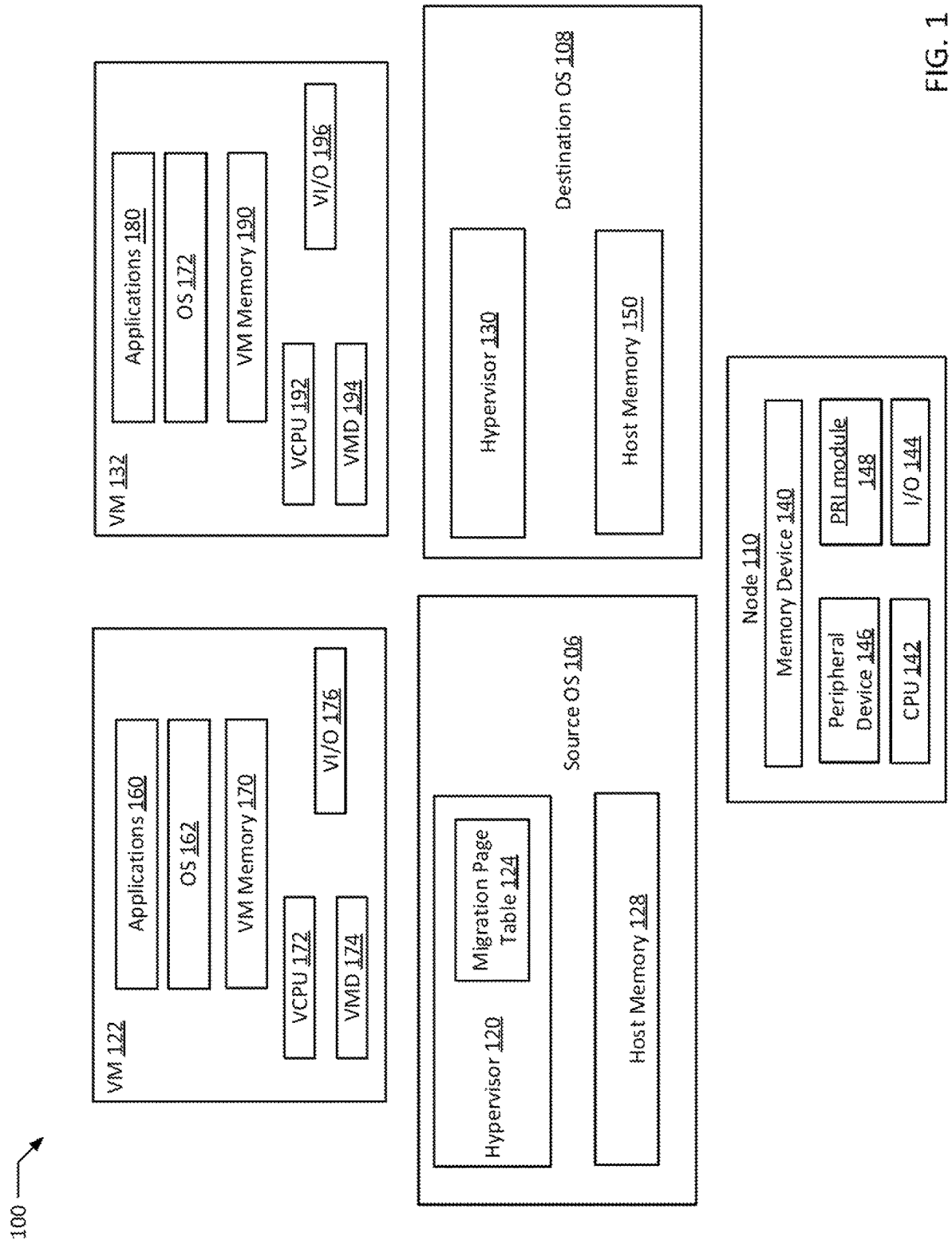
FIG. 1 is a block diagram of a Page Request Interface overhead reduction system according to an example of the present disclosure.

In many computer systems, physical hardware may host isolated guests such as virtual machines (VMs) and/or containers. In an example, the VM may be a robust simulation of an actual physical computer system using a hypervisor to allocate physical resources to the VM. In some examples, a container-based virtualization system such as Red Hat® OpenShift® or Docker® may be advantageous, as container-based virtualization systems may be lighter weight than systems using VMs with hypervisors. In the case of containers, oftentimes a container will be hosted on a physical host or VM that already has an operating system executing, and the container may be hosted on the operating system of the physical host or VM. In sharing physical computing resources, isolated guests and/or a hypervisor controlling them may also have access to shared components of the underlying physical host.

In typical computer systems, a VM may migrate data in memory locations between hypervisors of the respective VMs through live migrations. Typically, live migration involves moving a running VM or application between different physical machines without disconnecting the client or application, such that memory, storage, and network connectivity of the VM are transferred from the original guest machine (e.g., source host) to the destination (e.g., destination host).

An issue with live migration, and similar memory migration/copy procedures, arises in conjunction with pass-through devices (e.g., virtual devices that are under guest control) that have direct memory access (DMA). Without any additional flags or information about how to manage pages mapped to an input/output (I/O) device, a host would need to be conservatively configured such that if an I/O device can write to a page, the I/O device is treated as having written to the page. In other words, to maintain data integrity between the source host and destination host during VM migration or whenever the source host has disabled write-access to a range in memory, an access attempt by an I/O device without additional information/flags would be identified as read/write access by the I/O device and the memory accessed would be copied again, to maintain data integrity. Accordingly, I/O writable pages need to be constantly copied to a destination host to ensure the memory on the source host matches the memory at the destination host. The necessity under current systems to recopy all or most I/O writable pages breaks memory tracking and/or makes it inefficient for migrating large amounts of memory under I/O devices.

In current systems, peripheral component interconnect express (PCIe) systems use an address translation services (ATS) that implement a Page Request Interface (PRI) or similar feature. Generally, PCIe is an interface standard for connecting high-speed components. The computer system may use a translation agent to translate addresses from a virtual address provided by the (I/O device to a physical address in system memory. In current systems, each time a device accesses a page, the device sends a page request message (PRM) to the host (e.g. source host) using the PRI. The requesting device sends a non-writable (NW) flag if the device is requiring read only access. When the flag is set on the incoming PRM, the source host identifies (e.g., interprets, flags, determines, etc.) that the data in memory accessed by the device are read only, and does not need to be re-copied to the destination host. If the flag is not set on the incoming PRM, the source host identifies that the data in memory accessed by the device have writable access, and the source host re-copies the accessed data to the destination host.

Accesses requests by the device are cached such that a PRM is not re-sent with each read/write request from the device over a given time period. However, on non-local workloads, a PRM is required to be sent when a device is accessing a page in current systems. Accordingly, those situations add a problematic overhead of at least 16 bytes per request and 16 bytes per response per each 4K page of memory, resulting in an overhead of 0.78%, or more (e.g., (16 byte request+16 byte response)/4096 byte page=0.78%).

The present disclosure reduces problematic PRI overhead in some examples through a modification of the source host to send a range or list of memory pages that are being migrated to the destination host. The modification of the source host can also be used to send a range or list of memory pages that are write protected to reduce problematic PRI overhead. Typical PRI implementations can incur decreased or slowed performance on VMs during migration or when write-protecting memory as the additional bytes in PRM requests from accessing devices increase latency and/or slowed performance. Additionally, current systems have tried to alleviate the overhead by implementing memory tracking by a driver, thereby removing the need for PRI. However, in those instances, memory tracking by driver has been proven to have even higher overhead than PRI, for example, an overhead increase by an order of 10%.

Instead of removing PRM or requiring PRM requests for all instance of a device accessing a page on the VM, the PRI overhead reduction for VMs system reduces latency on the VM being used by the user by eliminating the need for PRM requests—and the at least 16 bytes request+16 response per each 4K page of memory required—for devices accessing memory pages outside of the range being migrated between VMs or that are write-protected. For example, by compiling and/or sending a migration page table or similar list of migration memory pages, a device accessing a page outside the range or list of memory pages that are being migrated to the destination host can bypass sending a PRM. Further, the migration page table will be null or empty when migration is not in progress, thereby allowing memory access by the device without any PRI overhead. In another example, by compiling and/or sending a write-protection table or similar list that identifies sections of memory that are write-protected, an accessing device or service can avoid re-copying those sections of memory, because those sections do not have to be conservatively identified as being written to by an I/O device with read-only access.

The PRI overhead reduction system improves throughput for PCIe limited flows by about 1%. For example, in instances of migrating 10-100 gigabits per second a migration over the course of a two-minute time period would see a performance increase between 0.5% and 1%. In systems where a networking device is accessing a page, the PRI overhead reduction system may provide a greater performance increase as networking instances have smaller packet sizes. Accordingly, the PRI overhead reduction system provides less latency of the VM during the live migration as the decrease in the instances of PRMs being sent through PRI needed removes the bytes needed for each request and corresponding response being transmitted over the smaller packets. The PRI overhead reduction system can provide increased storage device integrity as accessing memory pages outside of the range being migrated between VMs or listed as having write-protection may have read and write access. Accordingly, the PRI overhead reduction system reduces latency on the VM being used by the user throughout the live migration process and/or when using write-protection compared to typical PRI implementations.

Vendors using a hypervisor (e.g., Kernel-based Virtual Machine (KVM)) on an operating system, such as Red Hat® Enterprise Linux® (REHL) may use the system and methods disclosed herein for communication, write-protection, and memory migration between VMs and the hypervisor. When handling network traffic and communication across security boundaries, hypervisor vendors and operating system (OS) vendors often attempt to improve performance, throughput, and latency. By compiling and/or sending a migration or write-protection page table or similar list of memory pages assigned for migration or write-protection, such that a device accessing a page outside the range or list of memory pages that are being migrated to the destination host can bypass sending a PRM, the PRI overhead reduction for VMs system reduces byte overhead of PRM requests/responses and performance may be improved.

As used herein the term "page" or "memory page" refers to a page, memory page, or virtual page that is a fixed-length contiguous block of virtual memory, described by a single entry in the page table. The page is the smallest unit of data for memory management in a virtual memory operating system. Similarly, a page frame is the smallest fixed-length contiguous block of physical memory into which memory pages are mapped by the operating system. In an example, memory paging is implemented to track the virtual addresses of the data of executing applications.

FIG. 1 depicts a high-level component diagram of an example PRI overhead reduction for VMs computing system 100 in accordance with one or more aspects of the present disclosure. The computing system 100 may include an operating system (e.g., source OS 106, destination OS 108), one or more VMs (e.g., VM 122, 132), and a node 110.

Each of the VMs (VM 122, VM 132) may include an OS, VM memory, a virtual CPU (VCPU), virtual memory devices (VMD), and virtual input/output devices (VI/O). In an example, applications (e.g., application 160, 180) running on a VM may be dependent on the underlying hardware and/or OS. For example, the VM 122 includes an OS 162, guest memory or VM memory 170, a virtual CPU 192, a virtual memory device(s) 174, virtual input/output device 176, and applications 160. VM memory 170 may include one or more memory pages. Similarly, the VM 132 includes an OS 172, guest memory or VM memory 190, a virtual CPU 192, a virtual memory device(s) 194, virtual input/output device 196, and application 180. VM memory 190 may include one or more memory pages.

The computing system 100 may also include a source OS 106 (e.g., source host) and a destination OS 108 (e.g., a destination host). The source OS 106 includes host memory 128 and a hypervisor 120. The hypervisor 120 may manage host memory 128 for the host operating system 106 as well as memory allocated to the VMs 122, 132 and guest operating system 162, 172 such as guest memory or VM memory 170, 190 provided to guest OS 162, 172. The host memory 128 and VM memory 170, 190 may be divided into a plurality of memory pages that are managed by the hypervisor 120. VM memory 170, 190 allocated to the VM OS 162, 172 may be mapped from host memory 128 such that when a guest application 160, 180 uses or accesses a memory page of VM memory 170, 190, the guest application 160, 180 is actually using or accessing host memory 128.

The hypervisor 120 may include a memory manager or similar component configured to manage the generation, compilation, transmission, and other aspects of a page table 124 (e.g., a migration page table or a protection page table) for PRI overhead reduction, as described herein. In those examples, a memory manager may execute independently, as part of source OS 106, as part of hypervisor 120, or within a virtualized guest. In another example, memory manager may be a component interface between a CPU 142 and memory device 140, managing access to memory device 140 by a physical device or node 110, VM 122, 132 and/or destination OS 108 (e.g., through hypervisor 120).

The destination OS 108 includes host memory 150 and a hypervisor 130. The hypervisor 130 may manage host memory 150 for the destination operating system 108 as well as memory allocated to the VMs 122, 132 and guest operating system 162, 172 such as guest memory or VM memory 170, 190 provided to guest OS 162, 172. The host memory 150 and VM memory 170, 190 may be divided into a plurality of memory pages that are managed by the hypervisor 130. VM memory 170, 190 allocated to the VM OS 162, 172 may be mapped from host memory 128 such that when a guest application 160, 180 uses or accesses a memory page of VM memory 170, 190, the guest application 160, 180 is actually using or accessing host memory 150.

During a live migration, the hypervisor 120 of the source OS 106 may facilitate the copying of data from the host memory 128 to the host memory 150 on the destination OS 108. The hypervisor 130 of the destination OS 108 and the hypervisor 120 of the source OS 106 may be in communication to facilitate the migration and to allow for the VM 122, 132 on the source OS 106 to keep running while the memory is being set up and migrated to destination OS 108.

When write-protection is enabled, the source OS 106 prevents the various applications and other devices from modifying or deleting data in the indicated ranges of memory. Accordingly, by compiling and/or sending a write-protection table or similar list that identifies sections of memory that are write-protected to a device or service that accesses these protected ranges of memory, an accessing device or service can avoid re-copying those sections of memory when performing a read-only operation, because those sections do not have to be conservatively identified as being written to by an I/O device.

The computer system 100 may include one or more nodes 110. Each node 110 may in turn include one or more physical processors (e.g., CPU 142) communicatively coupled to memory devices 140 and input/output devices (e.g., I/O 144). Local connections within each node, including the connections between a CPU 142 and a memory device 140, may be provided by one or more local buses of suitable architecture, for example, peripheral component interconnect (PCI) or peripheral device 146. The node 110 may be a computer, such as a physical machine and may include a device, such as hardware device. In an example, a hardware device may include a network device (e.g., a network adapter or any other component that connects a computer to a computer network), a PCI device, storage devices, disk drives, sound or video adaptors, photo/video cameras, printer devices, keyboards, displays, etc. VMs 122, 132 may be provisioned on the same host or node (e.g., node 110) or different nodes. For example, VM 122 and VM 132 may both be provisioned on node 110. Alternatively, VM 122 may be provided on node 110 while VM 132 is provisioned on a different node.

As used herein, physical processor, processor, or central processing unit (CPU) 120 refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a CPU.

As discussed herein, a memory device 140 refers to a volatile or non-volatile memory device, such as RAM, ROM, EEPROM, or any other device capable of storing data. As discussed herein, I/O device 144 refers to a device capable of providing an interface between one or more processor pins and an external device capable of inputting and/or outputting binary data.

CPU 142 may be interconnected using a variety of techniques, ranging from a point-to-point processor interconnect, to a system area network, such as an Ethernet-based network. Local connections within each node, may be provided by one or more local buses of suitable architecture, for example, PCI or peripheral device 146.

A PRI module 148 may be communicatively coupled to the peripheral device 146 and/or CPU 142, memory device(s) 140, and I/O device(s) 144. In the PRI overhead reduction computing system 100, the PRI module 148 may be configured to access, check, reference, etc., the page table 124 to determine if each page to be accessed is within the range of memory being migrated from the source OS 106 to the destination OS 108 or write-protection. If a page to be accessed is outside of the range of memory being migrated, the PRI module 148 bypasses a PRM or similar communication with the source OS 106. An example is illustrated below in FIG. 2. If a page to be accessed is within the range of memory being migrated, the PRI module 148 sends a PRM to the hypervisor 120 and/or source OS 106. An example is illustrated below in FIG. 3. In an example, the requesting device sends a non-writable (NW) flag if the device is requiring read only access. If the flag is not set on the incoming PRM, the source OS 106 identifies that the data in memory accessed by the device has writable access, and the source OS 106 re-copies the accessed data to the destination OS 108. In an example, when the requesting device indicates that the device has write access (e.g., via write flag or lack of NW flag), the source OS 106 copies the data to a different page in memory to assess whether the interactions from the requesting device modified the data, and may copy any modifications to the original page once write-protection is completed.

Figure 2:
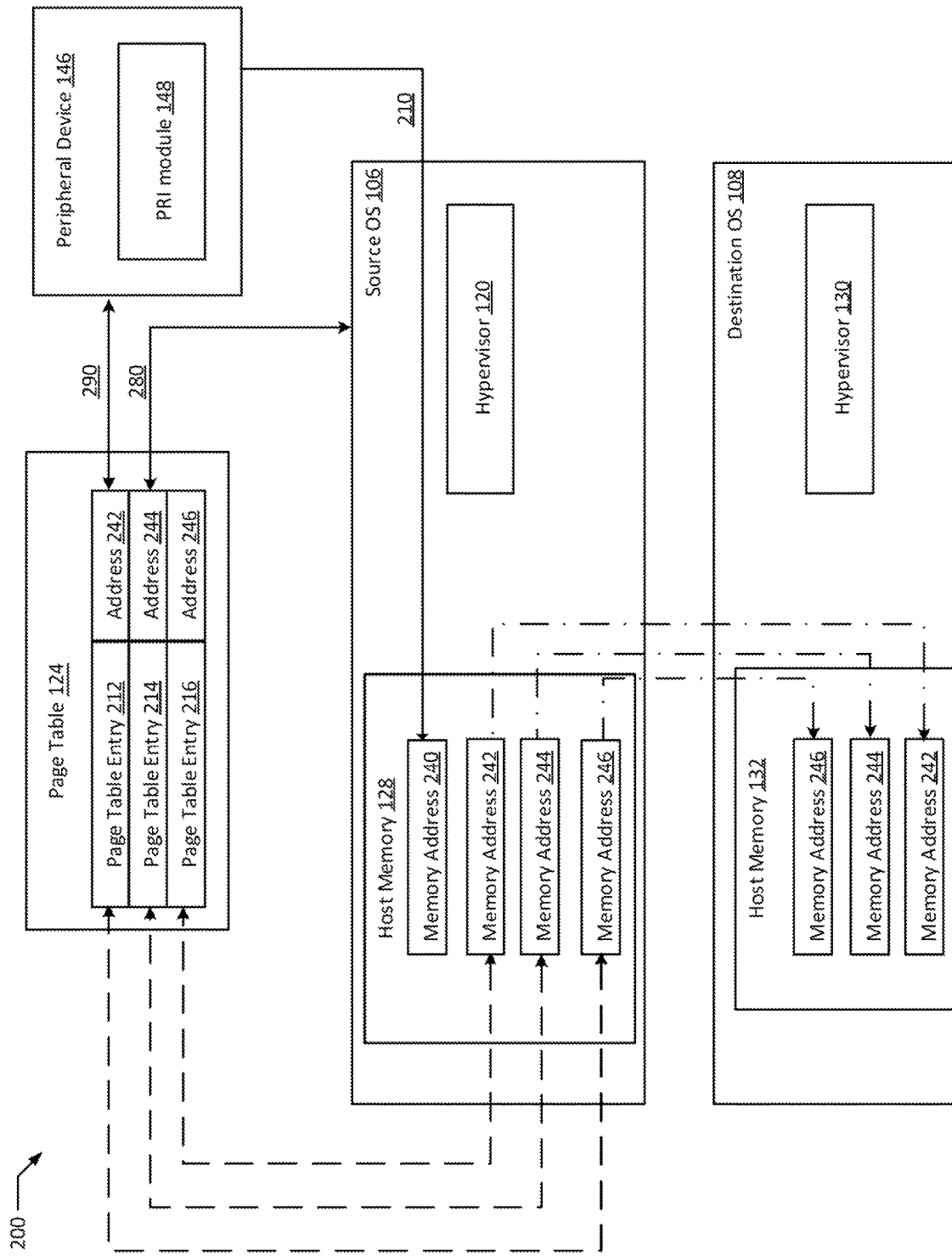
FIG. 2 is a flow block diagram illustrating accessing a page outside of a migration memory range in a Page Request Interface overhead reduction system according to an example of the present disclosure.
Figure 3:
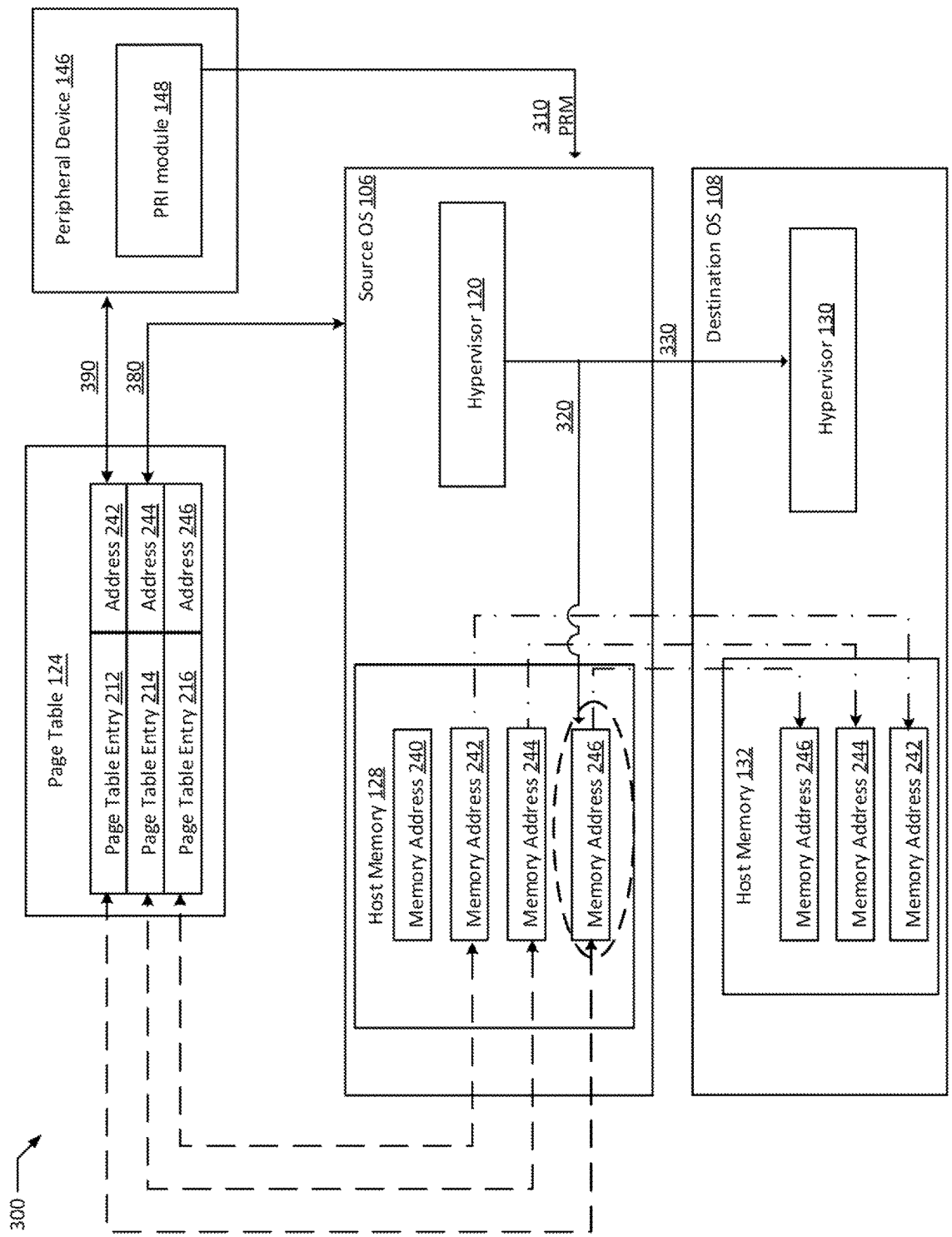
FIG. 3 is a flow block diagram illustrating accessing a page inside of a migration memory range in a Page Request Interface overhead reduction system according to an example of the present disclosure.

FIG. 2 is a flow block diagram illustrating a method 200 of accessing a page outside of a first memory range and FIG. 3 is a flow block diagram illustrating a method 300 of accessing a page within of a first memory range according to an example of the present disclosure. The methods 200, 300 are implemented in a PRI overhead reduction system, for example, the computing system 100 of FIG. 1.

The methods 200, 300 include a PRI module 148 on a peripheral device 146 that may be understood as attempting to access a memory page associated with a memory address of physical memory of the source OS 106. The attempt to access occurs during a migration of a plurality of memory addresses 242, 244, 246 from the source OS 106 to the destination OS 108. In both method 200 and method 300, the PRI module 148 checks the page table 124 generated by the source OS 106 to determine if each page to be accessed is within the range of memory pages being migrated to the destination OS 108. In an example, the PRI module 148 is communicatively coupled to CPU 142 and/or another component within node 110.

Additionally or alternatively, the methods 200, 300 include a PRI module 148 on a peripheral device 146 that may be understood as attempting to write to a memory page associated with a memory address of physical memory of the source OS 106. The attempt to write occurs when a plurality of memory addresses 242, 244, 246 are write-protected by the source OS 106. In both method 200, 300, the PRI module 148 checks the page table 124 generated by the source OS 106 to determine if each page to be accessed is within the range of memory pages that are write-protected. In an example, the PRI module 148 is communicatively coupled to CPU 142 and/or another component within node 110.

Referring to FIG. 2, the source OS 106 may be completing a live migration of a range of memory addresses (e.g., memory pages) 242, 244, 246 or performing a task that has write-protected (at least temporarily) these ranges. The source OS 106 generates the page table 124 that comprises page table entries 212, 214, 216 mapped to each address 242, 244, 246 of physical memory of source OS 106. In some embodiments, the page table entries may also comprise Page Frame Numbers (PFN) (e.g., address of memory allocated to an application in the application space) to each address 242, 244, 246 (e.g., address of physical memory of source OS 106) or map to PFNs. In an example, the page table 124 just includes the address of physical memory 128 of host OS 106. In another example the page table 124 further comprises protection identifiers that indicate the access status of a page corresponding to the page entry 212, 214, 216 of the migration page table 124. For example, a protection identifier may be used to define that a given page is writable (or read-write), write-protected (or read-only), executable (or executable and readable), executable only, etc.

The source OS 106 may transmit 280 the page table 124 to a location on the source OS 106, the node 110, to the peripheral device 146, or a similar location where the PRI module 148 can access 290 the page table 124. The PRI module 148 checks 210 the page table 124 before accessing the page at memory address 240. The page at memory address 240 may be a plurality of memory addresses accessed by a component of the node 110, associated with an application running on a VM 122, 132, and/or similar application or component.

In method 200, the PRI module 148 identifies that the memory address 240 to be accessed is not within the range of memory addresses (e.g., memory pages) 242, 244, 246 in the page table 124, the PRI module 148 bypasses PRI and accesses the memory address 240.

Referring to FIG. 3, the source OS 106 may be completing a live migration of a range of memory addresses (e.g., memory pages) 242, 244, 246 or performing a task that has write-protected (at least temporarily) these ranges. The source OS 106 generates the page table 124 that comprises page table entries 212, 214, 216 mapped to each address 242, 244, 246 of physical memory of source OS 106. In some embodiments, the page table entries may also comprise PFNs (e.g., address of memory allocated to an application in the application space) to each address 242, 244, 246 (e.g., address of physical memory of source OS 106) or map to PFNs. In an example, the page table 124 just includes the address of physical memory 128 of host OS 106. In another example the page table 124 further comprises protection identifiers that indicate the access status of a page corresponding to the page entry 212, 214, 216 of the page table 124. For example, a protection identifier may be used to define that a given page is writable (or read-write), write-protected (or read-only), executable (or executable and readable), executable only, etc.

The source OS 106 may transmit 380 the page table 124 to a location on the source OS 106, the node 110, to the peripheral device 146, or a similar location where the PRI module 148 can access 290 the page table 124. The PRI module 148 checks 390 the page table 124 before accessing the page at memory address 246. The page at memory address 246 may be a plurality of memory addresses accessed by a component of the node 110, associated with an application running on a VM 122, 132, and/or similar application or component.

In method 300, the PRI module 148 identifies that the memory address 246 to be accessed is within the range of memory addresses (e.g., memory pages) 242, 244, 246 in the page table 124. The PRI module 148 transmits a PRM 310 to the source OS 106. The PRI module may not have a NW flag set in the PRM 310 transmitted to the hypervisor 120 or component of the source OS 106. The source OS 106 identifies 320 that the data in memory address 246 accessed by the peripheral device 146 permits writable access and is being migrated, and the source host re-copies 330 the accessed data in memory address 246 to the destination OS 108.

The PRI module 148 may send a NW flag to the hypervisor 120 or component of the source OS 106 if the peripheral device 146 is requiring read only access. The source OS 106 identifies that the data in the memory accessed by the peripheral device 146 is read only (e.g., is write-protected) and does not need to be re-copied to the destination OS 108 as part of a VM migration (or absent a VM migration). In an example, if the PRI module 148 identifies that the memory address 246 is for read only access, the PRI module bypasses the PRM 310 and accesses the data in memory address 246.

Figure 4A:
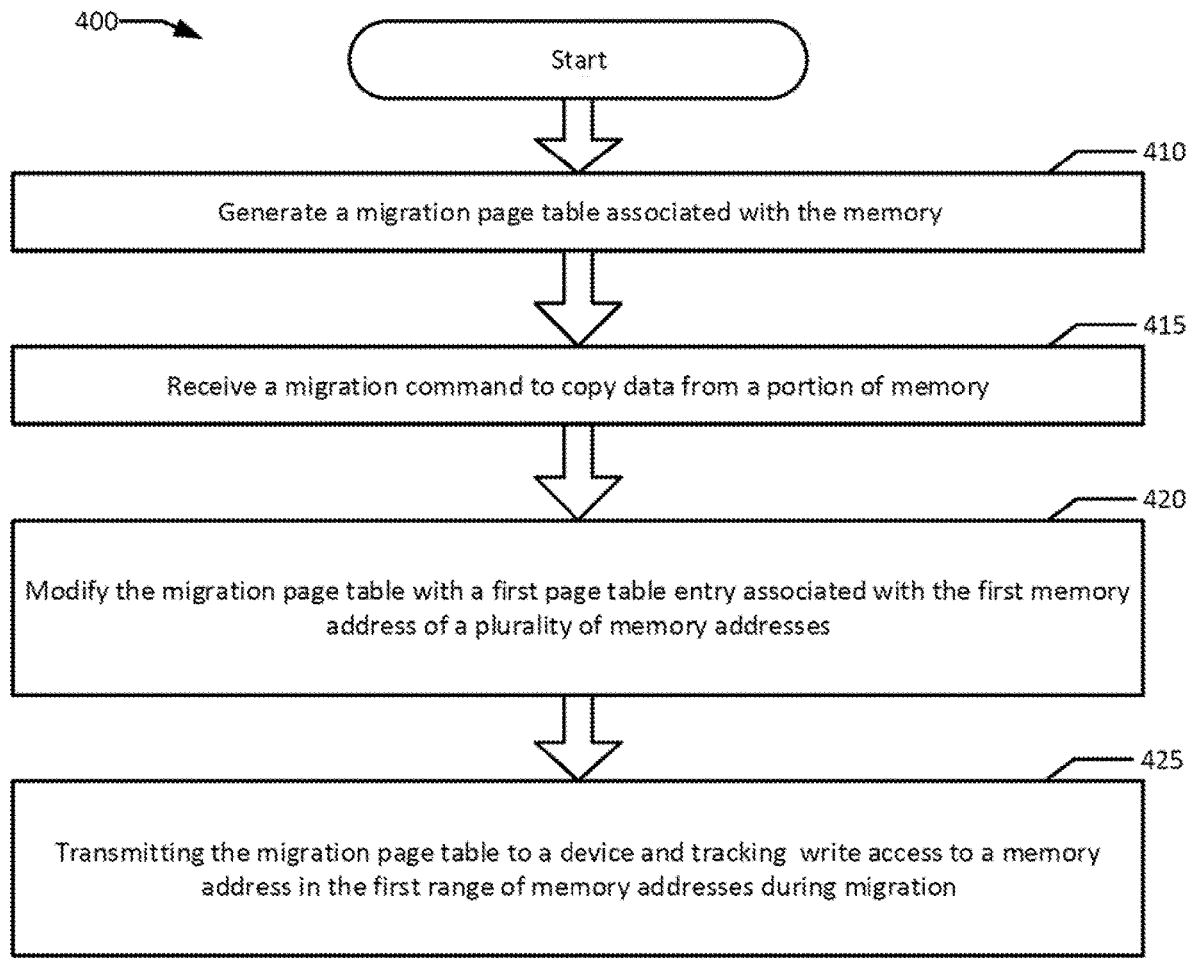
FIG. 4A is a flowchart illustrating an example of a Page Request Interface overhead reduction for virtual machine migration according to an example of the present disclosure.

FIG. 4A illustrates a flowchart illustrating an example method 400 for a PRI overhead reduction for VM migration according to an example embodiment of the present disclosure. Although the example method 400 is described with reference to the flowchart illustrated in FIG. 4A, it will be appreciated that many other methods of performing the acts associated with the method 400 may be used. For example, the order of some of the blocks may be changed, certain blocks may be combined with other blocks, blocks may be repeated, and some of the blocks described are optional. The method 400 may be performed by processing logic that may comprise hardware (circuitry, dedicated logic, etc.), software, or a combination of both.

The example method 400 includes generating a page table associated with memory (block 410). For example, a hypervisor 120 may generate a migration page table as a page table 124. In an example, the source OS 106 or similar application on the source OS 106 may generate the page table 124. The method also includes receiving a migration command to copy data from a portion of memory (block 415). For example, the hypervisor 120 of the source OS 106 may receive a command to copy at least a portion of host memory 128 to the host memory 150 on the destination OS 108. In an example, the hypervisor 120 of the source OS 106 communicates with the hypervisor 130 of the destination OS 108 to facilitate the live migration.

The method 400 also includes modifying the page table with a first page table entry associated with the first memory address of a plurality of memory addresses (block 420). For example, the hypervisor 120 may modify the migration page table 124 to include a plurality of page table entries 212, 214, 216 mapped to a plurality of memory addresses 242, 244, 246 being migrated. The method 400 also includes transmitting the page table to a device and tracking write access to a memory address in the first range of memory addresses during migration (block 425). For example, the source OS 106 may transmit the page table 124 to a peripheral device 146 or PRI module 148 in a device that will accesses a page in the host memory 128 on the source OS 106.

Figure 4B:
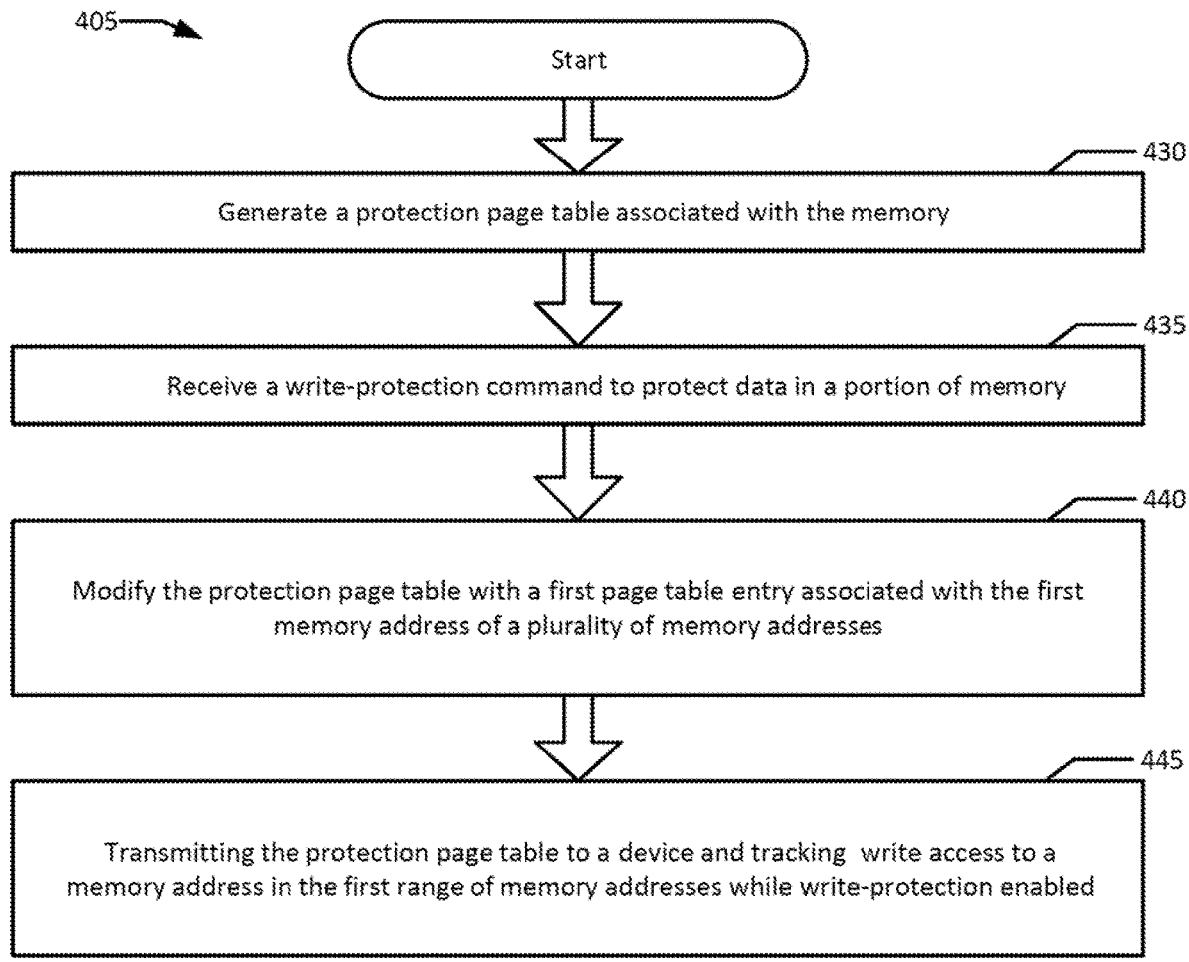
FIG. 4B is a flowchart illustrating an example of a Page Request Interface overhead reduction for memory write protection according to an example of the present disclosure.

FIG. 4B illustrates a flowchart illustrating an example method 405 for a PRI overhead reduction for memory write protection according to an example of the present disclosure. Although the example method 405 is described with reference to the flowchart illustrated in FIG. 4B, it will be appreciated that many other methods of performing the acts associated with the method 405 may be used. For example, the order of some of the blocks may be changed, certain blocks may be combined with other blocks, blocks may be repeated, and some of the blocks described are optional. The method 405 may be performed by processing logic that may comprise hardware (circuitry, dedicated logic, etc.), software, or a combination of both.

The example method 405 includes generating a page table associated with memory (block 430). For example, a hypervisor 120 may generate a write-protection page table as a page table 124. In an example, the source OS 106 or similar application on the source OS 106 may generate the protection page table 124. The method also includes receiving a write-protection command to protect data in a portion of the memory from being written to, deleted, or otherwise modified (block 435). For example, the hypervisor 120 of the source OS 106 may receive a command to write to at least a portion of host memory 128 or receive a command from an application with read/write access (which may be to read data without performing a write operation), and needs to identify whether the command should be performed on the memory (when write-protection is disabled), not performed (when write-protection is enabled), or deferred for performance (when write-protection is initially enabled and later disabled).

The method 405 also includes modifying the page table with a first page table entry associated with the first memory address of a plurality of memory addresses (block 440). For example, the hypervisor 120 may modify the page table 124 to include a plurality of page table entries 212, 214, 216 mapped to a plurality of memory addresses 242, 244, 246 being write-protected. The method 405 also includes transmitting the page table to a device and tracking write access to a memory address in the first range of memory addresses while write-protection is enabled (block 445). For example, the source OS 106 may transmit the page table 124 to a peripheral device 146 or PRI module 148 in a device that will accesses a page in the host memory 128 on the source OS 106.

Figure 5A:
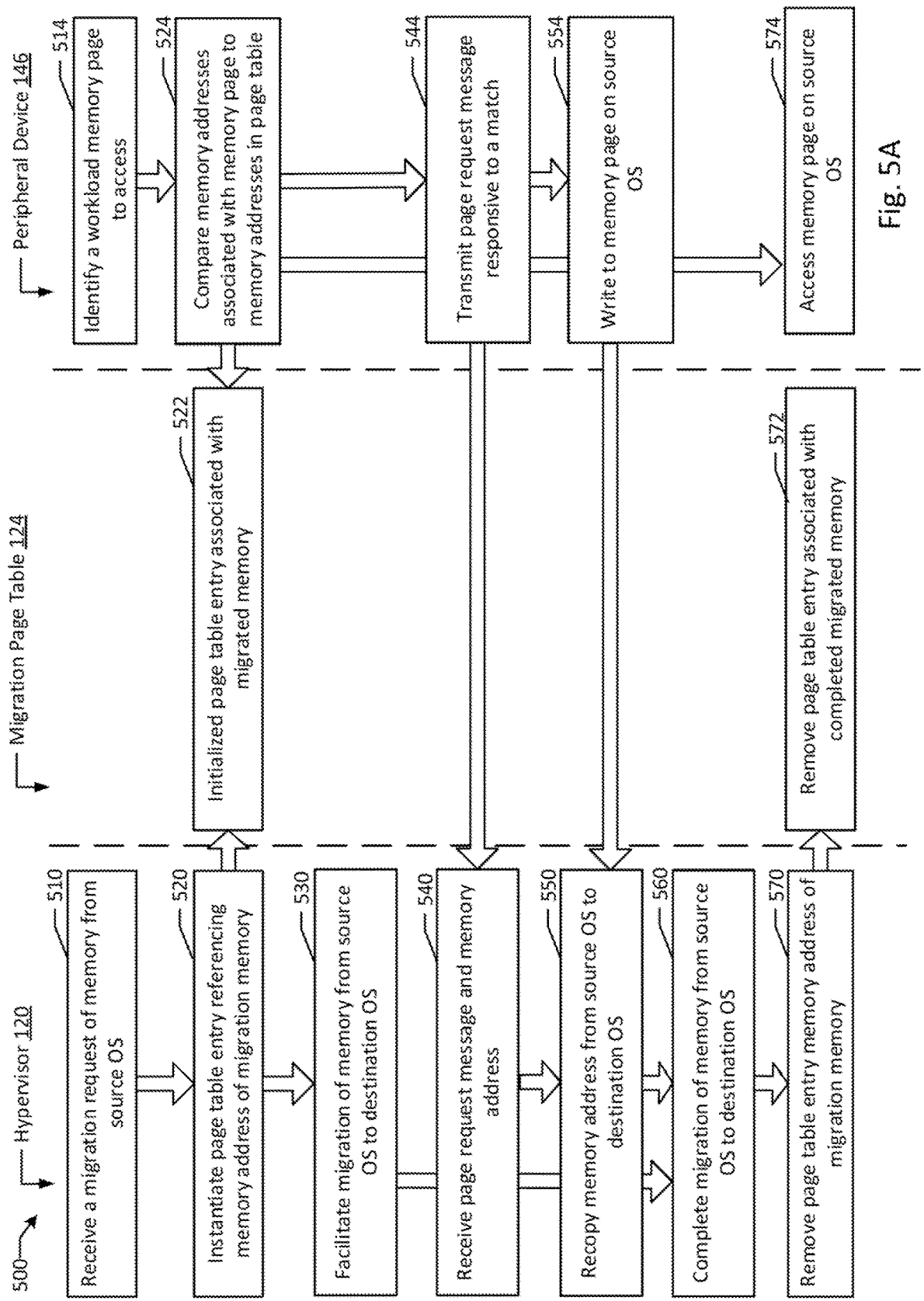
FIG. 5A is a flow diagram illustrating an example of Page Request Interface overhead reduction for virtual machine migration according to an example of the present disclosure.

FIG. 5A depicts a flow depicts a flow diagram illustrating an example method 500 for PRI overhead reduction for VM migration according to an example embodiment of the present disclosure. Although the example method 500 is described with reference to the flow diagram illustrated in FIG. 5A, it will be appreciated that many other methods of performing the acts associated with the method may be used. For example, the order of some of the blocks may be changed, certain blocks may be combined with other blocks, blocks may be repeated, and some of the blocks described are optional. The method may be performed by processing logic that may comprise (e.g., circuitry, dedicated logic, etc.), software, or a combination of both.

In the illustrated example, a hypervisor 120 receives a migration request to migrate host memory of a source OS to a destination OS (block 510). In an example, the migration request includes moving a running VM or application between the source OS and destination OS without disconnecting the client or application. A page table entry referencing the memory addresses of the host memory to be migrated is instantiated (block 520) and the migration page table 124 is initialized (e.g., generated) with a page table entry associated with each memory page being migrated from the source OS to the destination OS (block 522). In an example, the migration page table 124 may be transmitted to the peripheral device 146.

In an example, the memory pages to be transferred are a range of memory address in the host memory that may be sequential or non-sequential memory addresses. In an example, the page table entry comprises a plurality of page table entries and the first range of memory addresses comprises a plurality of memory addresses. Each page table entry in plurality of page table entries is associated with a memory address in the plurality of memory addresses being copied from the source host to the destination host. The hypervisor 120 facilitates the migration of host memory from the source OS to the destination OS (block 530) and if no PRM are received by devices accesses the migration memory, the migration of memory from the source OS and destination OS is completed (block 560).

During the live migration, a peripheral device 146 identifies a workload memory page or memory pages to access on the source OS (block 514). In an example, an application on the VM is accessed by a guest user such that such that when the guest application uses or accesses a memory page of VM memory, the guest application is actually using or accessing host memory 128 by way of the peripheral device 146. The peripheral device 146, or a PRI module, compares the memory addresses associated with the to-be accessed memory page(s) and compares the memory addresses to the memory addressed in the migration page table 124 (block 524). If the memory addresses associated with the to-be accessed memory page(s) are not within the range of memory addresses in the migration page table 124, the peripheral device 146 accesses the memory page(s) (block 574).

If the memory addresses associated with the to-be accessed memory page(s) is within the range of memory addresses in the migration page table 124, the peripheral device 146 transmits a PRM to the hypervisor 120 responsive to the match/within range memory addresses (block 544). The hypervisor 120 receives the PRM from a PRI module on the peripheral device 146 (block 540). The peripheral device 146 has write access to the memory page(s) and access the memory pages (block 554). The hypervisor 120 re-copies data from the memory page(s) accessed by the peripheral device 146 (block 550). In an example, the hypervisor 120 re-copies the data from the memory page(s) accessed by the peripheral device 146 after the peripheral device 146 stops access. In an example, the hypervisor 120 re-copies the data from the memory page(s) accessed by the peripheral device 146 throughout the live migration process.

After the migration of memory from the source OS and destination OS is completed (block 560), the hypervisor 120 removes the page table entries associated with the memory addresses that were migrated (block 570). The migration page table 124 is updated such that the page table entries associated with the memory addresses that were migrated are removed (block 572). In an example, the updated migration page table 124 may be transmitted to the peripheral device 146. In an example, the migration page table 124 is empty when no memory migration is occurring.

Figure 5B:
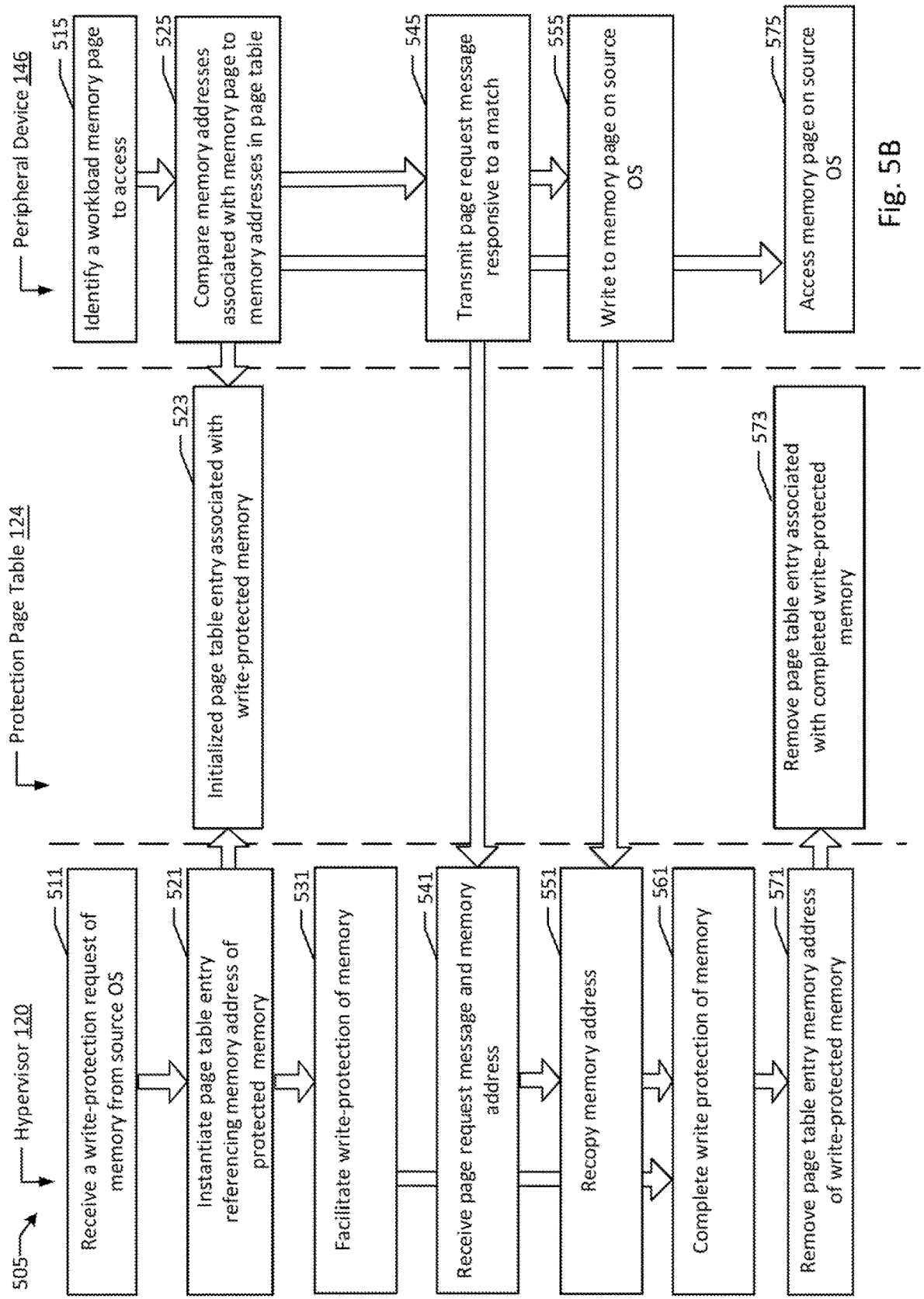
FIG. 5B is a flow diagram illustrating an example of Page Request Interface overhead reduction for virtual machine write protection according to an example of the present disclosure.

FIG. 5B depicts a flow depicts a flow diagram illustrating an example method 505 for PRI overhead reduction for VM migration according to an example embodiment of the present disclosure. Although the example method 505 is described with reference to the flow diagram illustrated in FIG. 5B, it will be appreciated that many other methods of performing the acts associated with the method may be used. For example, the order of some of the blocks may be changed, certain blocks may be combined with other blocks, blocks may be repeated, and some of the blocks described are optional. The method may be performed by processing logic that may comprise (e.g., circuitry, dedicated logic, etc.), software, or a combination of both.

In the illustrated example, a hypervisor 120 receives a write-protection request to write-protect a portion of a host memory of a source OS (block 511). In an example, the write-protection request includes write-protecting memory associated with a running VM or application without disconnecting the client or application. A page table entry referencing the memory addresses of the host memory to be write-protected is instantiated (block 521) and the page table 124 is initialized (e.g., generated) with a page table entry associated with each memory page being write-protected on the source OS (block 523). In an example, the protection page table 124 may be transmitted to the peripheral device 146.

In an example, the memory pages to be write-protected are a range of memory address in the host memory that may be sequential or non-sequential memory addresses. In an example, the page table entry comprises a plurality of page table entries and the first range of memory addresses comprises a plurality of memory addresses. Each page table entry in the plurality of page table entries is associated with a memory address in the plurality of memory addresses being write-protected. The hypervisor 120 facilitates the write-protection of host memory on the source OS (block 531) and if no PRM are received by devices accesses the write-protected memory, the write-protection of memory from the source OS and destination OS is completed (block 561).

During the write-protection, a peripheral device 146 identifies a workload memory page or memory pages to access on the source OS (block 515). In an example, an application on the VM is accessed by a guest user such that such that when the guest application uses or accesses a memory page of VM memory, the guest application is actually using or accessing host memory 128 by way of the peripheral device 146. The peripheral device 146, or a PRI module, compares the memory addresses associated with the to-be accessed memory page(s) and compares the memory addresses to the memory addressed in the page table 124 (block 525). If the memory addresses associated with the to-be accessed memory page(s) are not within the range of memory addresses in the migration page table 124, the peripheral device 146 accesses the memory page(s) (block 575).

If the memory addresses associated with the to-be accessed memory page(s) is within the range of memory addresses in the protection page table 124, the peripheral device 146 transmits a PRM to the hypervisor 120 responsive to the match/within range memory addresses (block 545). The hypervisor 120 receives the PRM from a PRI module on the peripheral device 146 (block 541). The peripheral device 146 has write access to the memory page(s) and accesses the memory pages (block 555). The hypervisor 120 re-copies data from the memory page(s) accessed by the peripheral device 146 (block 551). In an example, the hypervisor 120 re-copies the data from the memory page(s) accessed by the peripheral device 146 after the peripheral device 146 stops access. In an example, the hypervisor 120 re-copies the data from the memory page(s) accessed by the peripheral device 146 throughout the period while first range of the memory is write-protected.

After the write-protection of the memory is completed (block 561) (e.g., via a write-enable command), the hypervisor 120 removes the page table entries associated with the memory addresses that were write-protected (block 571). The page table 124 is updated such that the page table entries associated with the memory addresses that are (re)enabled for write access are removed (block 573). In an example, the updated page table 124 may be transmitted to the peripheral device 146. In an example, the page table 124 is empty when no memory is write-protected.

Figure 6A:
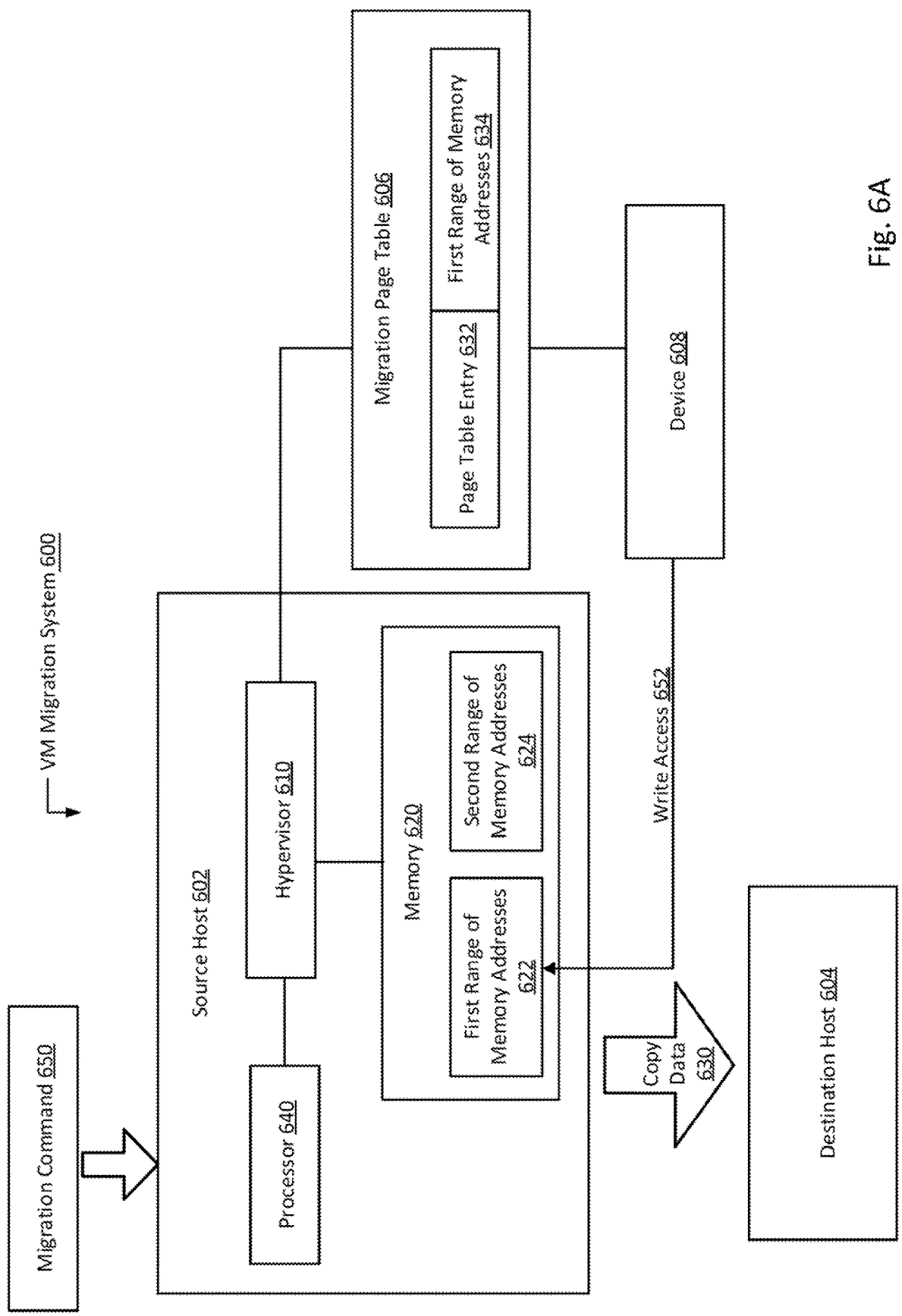
FIG. 6A is a block diagram of an example Page Request Interface overhead reduction for virtual machines system according to an example of the present disclosure.

FIG. 6A is a block diagram of an example a PRI overhead reduction for VM migration system 600 according to an example embodiment of the present disclosure. The system 600 includes a hypervisor 610, a memory 620, and a migration page table 606. The hypervisor 610 is configured to execute on a processor 640 to generate a migration page table 606 associated with the memory 620. The hypervisor 610 is also configured to receive a migration command 650 to copy data 630 from a portion of the memory 620 that includes a plurality of memory addresses on a source host 602 to a destination host 604. In an example, a first range of memory addresses 622 includes the data 630 copied from the portion of the memory 620, and a second range of memory addresses 624 includes data not copied. The hypervisor 610 is also configured to modify the migration page table 606 to include a page table entry 632 associated with the first range of memory addresses 634 being migrated from the source host 602 to the destination host 604. In an example, write access 652 to a memory address in the first range of memory addresses 622 by a device 608 during the migration command 650 is tracked.

Figure 6B:
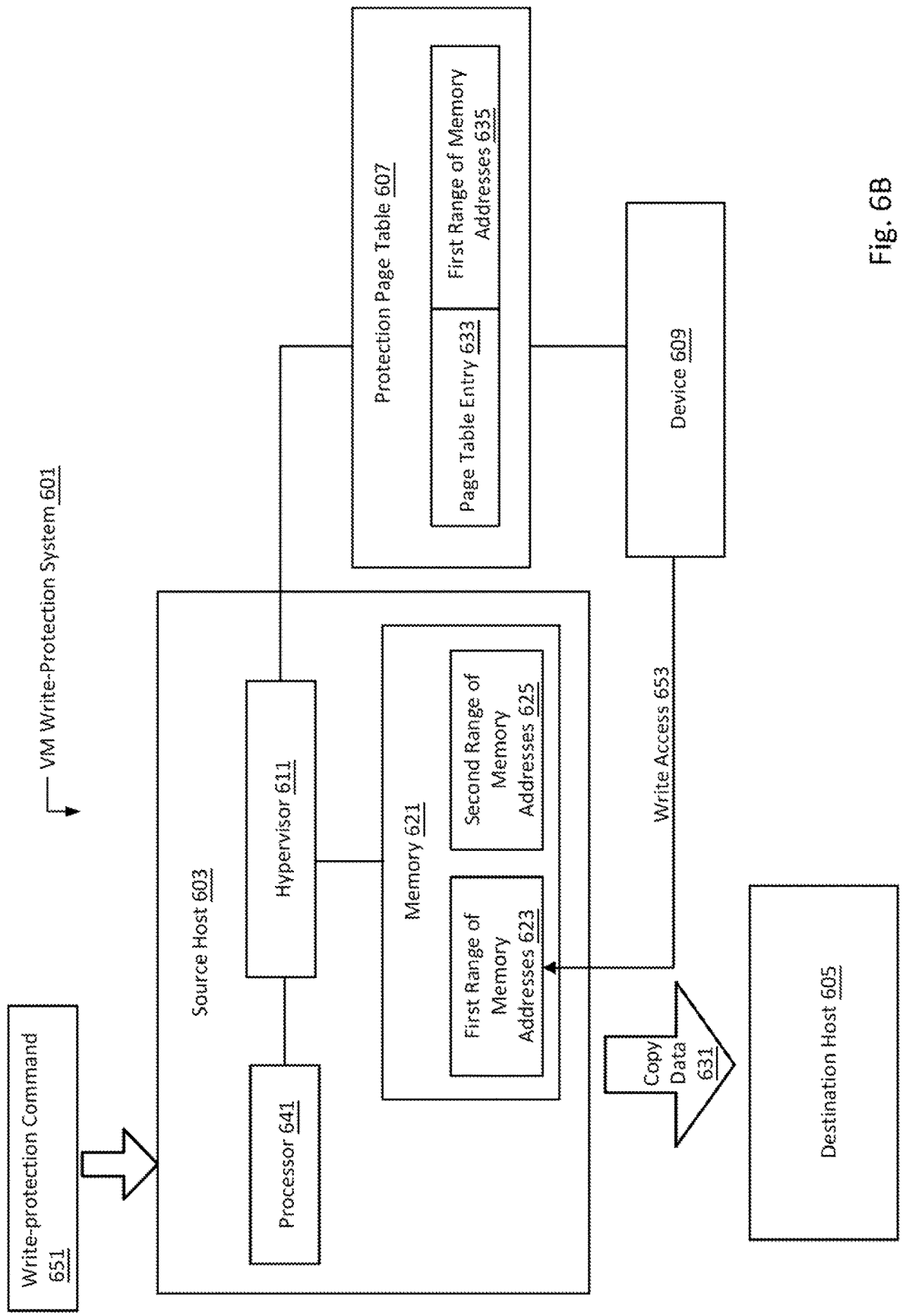
FIG. 6B is a block diagram of an example Page Request Interface overhead reduction for virtual machines system according to an example of the present disclosure.

FIG. 6B is a block diagram of an example a PRI overhead reduction for a write-protected VM system 601 according to an example embodiment of the present disclosure. The system 601 includes a hypervisor 611, a memory 621, and a protection page table 607. The hypervisor 611 is configured to execute on a processor 641 to generate a protection page table 607 associated with the memory 621. The hypervisor 611 is also configured to receive a write-protection command 651 to write-protect data 631 from a portion of the memory 621 that includes a plurality of memory addresses on a source host 603. In an example, a first range of memory addresses 623 includes the data 631 to be write-protected from the portion of the memory 621, and a second range of memory addresses 625 includes data not write-protected. The hypervisor 611 is also configured to modify the migration page table 607 to include a page table entry 633 associated with the first range of memory addresses 635 being write-protected on the source host 602. In an example, write access 653 to a memory address in the first range of memory addresses 623 by a device 609 is tracked, such as when a destination host 605 is copying or otherwise using the write-protected data 631 (e.g., during VM migration) so that any edits made to the data 631 by the device 609 can be forwarded to the destination host 605.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims. To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

The invention claimed is:

1. A system comprising:
a memory comprising a plurality of memory addresses on a host system; and
a hypervisor configured to execute on one or more processors to:
generate a page table associated with the memory;
in response to receiving a write-protection command to prevent write-access to data from a portion of the memory, write-protect a first range of memory addresses comprising the data write protected from the portion of the memory, wherein a second range of memory addresses comprises data not write protected in the memory; and
modify the page table to include a page table entry associated with the first range of memory addresses being write-protected, wherein write access to a memory address in the first range of memory addresses by a device during write-protection is tracked.

2. The system of claim 1, wherein the hypervisor is further configured to execute to transmit the page table to identify whether a workload memory address is within the first range of memory addresses being write-protected.

3. The system of claim 2, wherein the page table is transmitted to the device, the device accessing memory on the host system, wherein the device references the page table to identify if the workload memory address is within the first range of memory addresses being write-protected.

4. The system of claim 3, wherein the hypervisor is further configured to execute to:
receive a page request message from the device responsive to the workload memory address being within the first range of memory addresses, the page request message associated with the workload memory address in the first range of memory addresses and read/write access to data from the workload memory address in the first range of memory addresses; and transmit, after read/write access is completed, the data from the workload memory address in the first range of memory addresses from the host system to a destination host.

5. The system of claim 1, wherein the hypervisor is further configured to execute to:
receive a page request message, the page request message associated with a first memory address in the first range of memory addresses and read/write access to data from the first memory address in the first range of memory addresses; and
flag the first memory address to be subsequently copied to a destination host after read/write access is completed.

6. The system of claim 1, wherein the hypervisor is further configured to execute to:
receive a write-enable command associated with completion of write-protecting data from the portion of the memory; and
delete the page table entry associated with the first range of memory addresses.

7. The system of claim 6, wherein the hypervisor is further configured to execute to transmit an updated page table, the updated page table replacing the page table.

8. The system of claim 1, wherein the first range of memory addresses being write-protected is a plurality of sequential memory addresses.

9. The system of claim 1, wherein the first range of memory addresses being write-protected is a plurality of memory addresses with at least one memory address in the plurality of memory addresses being non-sequential with another memory address in the plurality of memory addresses.

10. The system of claim 1, wherein the page table comprises a plurality of page table entries, wherein the first range of memory addresses comprises a plurality of memory addresses, and wherein each page table entry in plurality of page table entries is associated with a memory address in the plurality of memory addresses being write-protected.

11. The system of claim 1, wherein the page table is subsequently accessed by a device accessing a workload memory location, wherein the workload memory location is compared to the first range of memory addresses in page table entry to output a result.

12. A method comprising:
generating, by a hypervisor, a protection page table associated with a memory comprising a plurality of memory addresses on a host system;
receiving, by the hypervisor, a command to write-protect data in a portion of the memory, a first range of memory addresses comprising the data write-protected in the portion of the memory, and a second range of memory addresses comprising data not write-protected; and
modifying, by the hypervisor, the protection page table to include a page table entry associated with the first range of memory addresses being write-protected, wherein write access to a memory address in the first range of memory addresses by a device while write-protection is enabled is tracked.

13. The method of claim 12, further comprising, transmitting, by the hypervisor, the protection page table, the protection page table referenced to identify whether a workload memory address is within the first range of memory addresses.

14. The method of claim 13, wherein the protection page table is transmitted to the device, the device accessing memory on the host system, wherein the device references the protection page table to identify whether the workload memory address is within the first range of memory addresses.

15. The method of claim 14, further comprising:
receiving, by the hypervisor, a page request message from the device, the page request message responsive to the workload memory address being within the first range of memory addresses, the page request message associated with the workload memory address in the first range of memory addresses and read/write access to data from the workload memory address in the first range of memory addresses; and
copying, by the hypervisor, the data from the workload memory address in the first range of memory addresses from the host system to destination workload memory addresses of a destination host.

16. The method of claim 12, further comprising:
receiving, by the hypervisor, a page request message, the page request message associated with a first memory address in the first range of memory addresses and read/write access to data from the first memory address in the first range of memory addresses; and
flagging, by the hypervisor, the first memory address to be subsequently copied to the destination host after read/write access is completed.

17. The method of claim 12, wherein the first range of memory addresses being write-protected is a plurality of sequential memory addresses.

18. The method of claim 12, wherein the first range of memory addresses being write-protected is a plurality of memory addresses with at least one memory address in the plurality of memory addresses being non-sequential with another memory address in the plurality of memory addresses.

19. The method of claim 12, wherein the protection page table comprises a plurality of page table entries, wherein the first range of memory addresses comprises a plurality of memory addresses, and wherein each page table entry in the plurality of page table entries is associated with a memory address in the plurality of memory addresses being write-protected.

20. A non-transitory machine-readable medium storing code, which when executed by a processor is configured to:
generate a page table associated with a memory, the memory comprising a plurality of memory addresses on a host system;
receive a write-protection command to write-protect data in a portion of the memory, including a first range of memory addresses comprising the data to be write-protected; and
modify the page table to include a page table entry associated with the first range of memory addresses being write-protected, wherein write access to a memory address in the first range of memory addresses by a device is tracked.

* * * * *